Nov. 27, 1956  E. J. THURBER  2,771,972
TORQUE CONVERTER
Filed July 12, 1950  3 Sheets-Sheet 1

Inventor
Edward J. Thurber

By
Scrivener Parker
ATTORNEYS

Nov. 27, 1956   E. J. THURBER   2,771,972
TORQUE CONVERTER

Filed July 12, 1950   3 Sheets-Sheet 2

INVENTOR
*Edward J. Thurber*

BY *Scrivener Parker*
ATTORNEYS

Nov. 27, 1956  E. J. THURBER  2,771,972
TORQUE CONVERTER
Filed July 12, 1950  3 Sheets-Sheet 3

INVENTOR
*Edward J. Thurber*

BY *Scrivener Parker*

ATTORNEYS

United States Patent Office 2,771,972
Patented Nov. 27, 1956

2,771,972

TORQUE CONVERTER

Edward J. Thurber, New Orleans, La., assignor to The Thurber Corporation, New Orleans, La., a corporation of Louisiana Application July 12, 1950, Serial No. 173,341

25 Claims. (Cl. 192—3.2)

This invention relates to a variable speed hydraulic transmission mechanism, and more particularly to a hydraulic mechanism of the torque converter type which is adapted to provide a highly efficient power transmission for motor vehicles and other types of installations.

One of the principal objects of the present invention is to provide a novel hydraulic torque converter including a pair of turbines which are constructed and arranged to rotate in opposite directions, the arrangement being such that the torques generated thereby may be compounded and delivered at a common terminal point.

Another object of the invention is to provide a novel torque converter construction of the above type wherein the generated torque may be directly employed for securing a forward or a reverse turbine drive and without the necessity of utilizing a conventional forward and reverse gear transmission.

A further object is to provide a novel arrangement which includes forward and reverse turbine driving members together with a direct driving member, these members terminating at a common point and being associated with means for selectively connecting a driven element to any of the three driving members.

Another object is to provide a novel construction for completely arresting the circulation and agitation of fluid in the torque converter in order to obtain an absolute neutralized condition thereof, thereby eliminating any tendency toward "creeping" and materially decreasing the generation of heat.

Still another object is to provide in a transmission of the above type, a novel arrangement for neutralizing the torque converter during certain selected periods of operation of the transmission and including the period during establishment of direct drive, the neutralized condition insuring that rotation of the turbine and impeller elements will be arrested and that circulation and agitation of the fluid will be eliminated in order to avoid any excessive heating conditions.

A further object includes the provision of a novel system of controls for the transmission which includes an arrangement for neutralizing the torque converter through the operation of a motor vehicle controlling element, such as an accelerator or other control.

Still another object comprehends a novel control arrangement including power means for establishing certain of the driving connections, such means functioning automatically and being supervised by operation of a controlling element of the motor vehicle, such as for example, the accelerator pedal.

A further object is to provide in a transmission of the foregoing character, a novel arrangement for automatically and/or semi-automatically establishing certain of the driving connections, wherein during operation of a motor vehicle, such driving connections may be effected under the control of a speed responsive governor in combination with the motor vehicle accelerator pedal.

A still further object includes the provision of a novel cooling system for the torque converter comprising air passages for conducting cooling air from the front of the motor vehicle, through the converter housing and exhausting such air at the bottom and rear of the housing.

The above and other novel features of the invention will appear more fully hereinafter from a consideration of the following detailed description when taken in connection with the accompanying drawings. It is to be expressly understood however, that the drawings are utilized for purposes of illustration only and are not designed as a definition of the limits of the invention, reference being had for this purpose to the appended claims.

In the drawings wherein similar reference characters refer to similar parts throughout the several views.

Figures 1, 2:
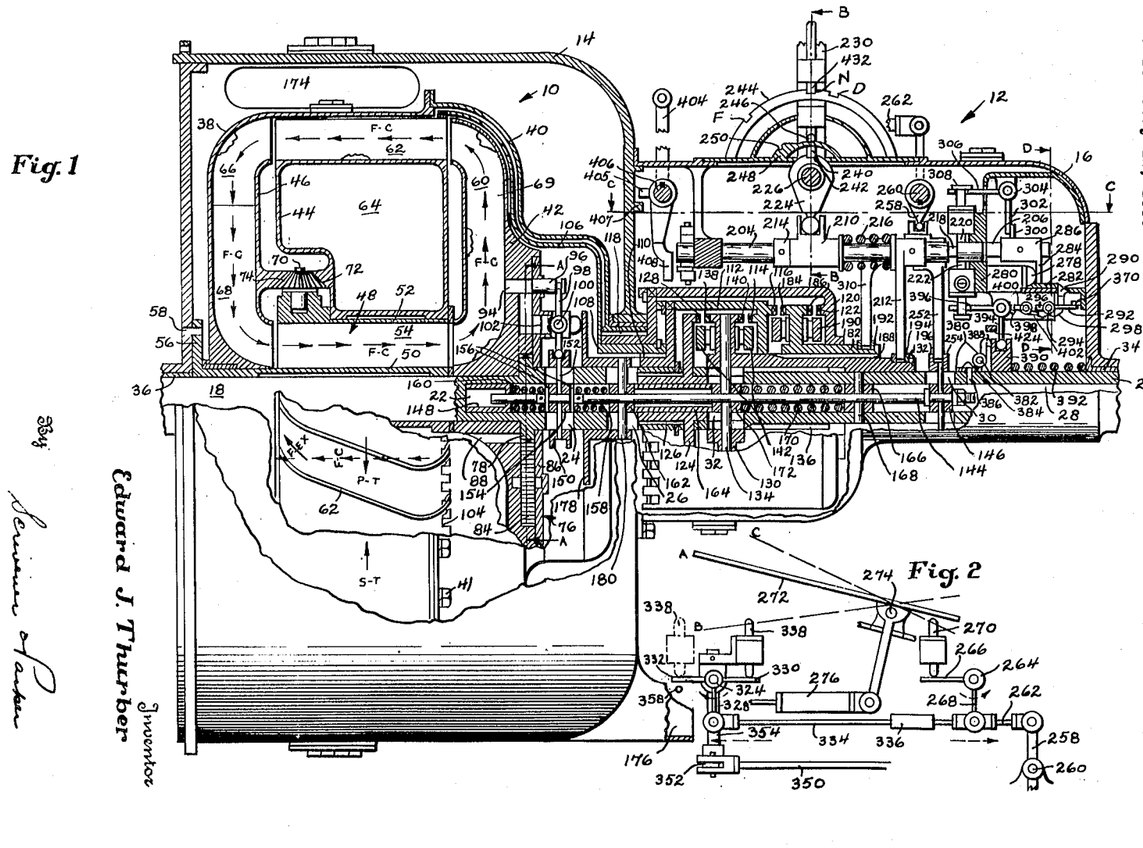
Fig. 1 is a side view partly in section of a hydraulic transmission mechanism and associated controls which embody the principles of the present invention.
Fig. 2 is a diagrammatic view of certain of the control elements which are operated by the accelerator pedal.

Referring more particularly to Fig. 1, a novel variable speed hydraulic transmission embodying the principles of the present invention is illustrated therein as embodying a torque converter 10 and a control mechanism 12, the torque converter being housed within a stationary casing 14 while the control mechanism 12 includes a stationary casing 16. The torque converter 10 is arranged to drivably connect a driving shaft 18 with a driven shaft 20 through connections to be more particularly pointed out hereinafter. Driving shaft 18 may be connected to a vehicle engine shaft or other driving member and includes a bore 22 and a pair of spaced-apart slots 24 and 26. The driven shaft 20 is provided with a bore 28 as well as being provided with slots 30 and 32. Driven shaft 20 is journalled in the casing 16 as by means of bearing 34 while the driving shaft 18 is journalled in a bearing 36 carried by the torque converter casing 14.

One of the important features of the invention resides in the construction of the torque converter 10 which provides a highly efficient construction for the transfer of power from the driving shaft 18 to the driven shaft 20. More particularly, the converter 10 includes forward and rear casing parts 38 and 40, these being connected together as by a series of bolts 41. The casing parts 38 and 40 contain the working elements of the converter and comprise an impeller 42, a primary turbine 44, a secondary turbine 46 and a fluid guide member 48. The latter includes inner and outer rings 50 and 52 which are connected by a series of vanes 54, the fluid guide member having a forwardly extending flange 56 which is secured at 58 to the casing 14 and is hence stationary. The impeller 42 is rotatably mounted on the driving shaft 18 and includes a plurality of radially extending vanes 60 which are adapted, when the impeller is rotated, to direct fluid radially outwardly as indicated by the arrows F—C. As viewed from the forward portion of the transmission device, that is looking from left to right in Fig. 1, the impeller 42 when rotated, is adapted to move in a clockwise direction. The primary turbine 44 is constructed to also move in a clockwise direction as indicated by the arrows P—T and is provided with an annularly arranged series of blades 62 for receiving the fluid from the blades 60 of the impeller. The primary turbine 44 is an axial flow turbine and the blades 62 are so curved as to direct the fluid axially therethrough as shown in Fig. 1, but to exhaust the fluid in a counterclockwise direction as indicated by the arrow F—Ex. As shown, the primary turbine 44 is formed on a sealed drum 64 which avoids the accumulation of excess fluid interiorly of the turbine. The turbine is rotatably supported on the ring 52 of the guide member 54.

As the fluid is exhausted in a counterclockwise direction from the primary turbine 44, it is directed into the secondary turbine 46 which is provided with a plurality of vanes or blades 66 which are so curved as to cause rotation of the secondary turbine 46 in a counterclockwise direction and to exhaust the fluid in a clockwise direction which corresponds to the direction of rotation of the impeller 42. As the fluid is exhausted from the vanes 66, it enters a chamber 68 from whence it is conducted through the vanes 54 of the guide member 48 to be returned to the impeller 42.

With the above construction, it will be seen that when the impeller 42 is rotated in a clockwise direction, a toroidal fluid working circuit 69 will be established in order to interlink the impeller with the primary turbine, the secondary turbine and the fluid guide member. It will also be observed that the primary turbine 44 rotates in a clockwise direction while the secondary turbine rotates in a counterclockwise direction. This difference in rotation between the two turbine members is utilized for the purpose of procuring forward and reverse turbine drives in a manner which will appear more fully hereinafter. In order to compound the torques from the two turbine members, the invention provides a novel arrangement including a pinion 70 mounted upon the stationary ring 52 and meshing with ring gears 72 and 74 respectively mounted on the primary and secondary turbines 44 and 46. Due to this arrangement, the torques delivered by the primary and secondary turbines are combined or compounded and such compounded torques are available when the transmission is established in a turbine reverse or turbine forward driving condition.

Figure 7:
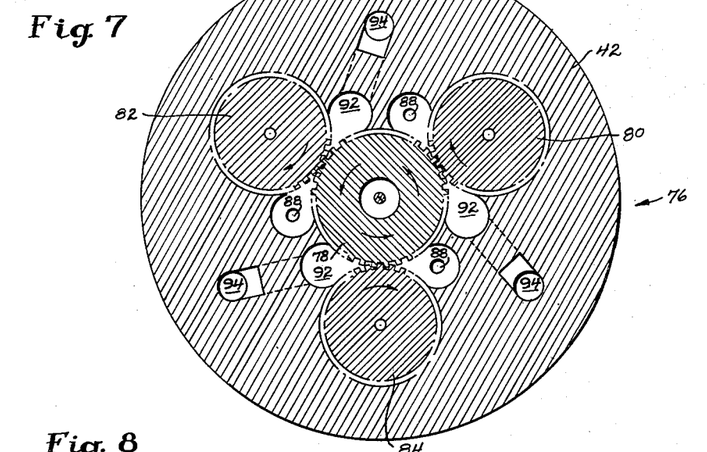
Fig 7 is a sectional view taken along line A—A of Fig. 1 and illustrates the cooperative elements of the fluid clutch for controlling the impeller of the torque converter.

A further important feature of the present invention resides in a novel construction for controlling the impeller 42 so that it may be readily connected to or disconnected from the driving shaft 18. As shown, such construction includes a fluid operated clutch 76 which is built integrally with the impeller 42. More particularly, the fluid operated clutch 76 includes a driving gear 78, Figs. 1 and 7, formed integrally with or otherwise secured to the driving shaft 18, the driving gear 78 being in meshing engagement with three pump gears 80, 82 and 84, these latter being rotatably carried by the impeller 42 and by a cover plate 86. As will be seen more particularly in Fig. 7, the impeller includes three spaced-apart inlet openings 88 which are adapted to conduct fluid from the fluid working circuit 69 to the intermeshing gears, the latter constituting three separate gear pumps for conducting the fluid to individual exhaust ports 94 and back to the fluid circuit 69 by way of exhaust openings 94. With such an arrangement, it will be readily understood that with unrestricted flow of fluid through the inlet ports 88 past the gear pumps and through the exhaust openings 94, no rotation will be imparted to the impeller 42 and the torque converter 10 will be in neutral condition. However, in the event that the exhaust openings 94 are closed, it will be readily seen that the pump gears 80, 82 and 84 will be locked with the driving gear 78 and that hence, under such conditions, the impeller 42 will be drivably connected to the driving shaft 18 in order to render the torque converter 10 operative.

In order to control the rotation of the impeller 42, the present invention provides a novel means for closing and opening the exhaust openings 94. More particularly, and referring to Fig. 1, such means includes a valve 96 for each opening 94, this valve being controlled by a lever 98 which is pivotally mounted at 100 to a part of the cover 86. Also associated with each of the exhaust ports 94 is a pressure operated plunger 102 which is always subjected to the pressure delivered by the gear pumps constituted by the gears 78, 80, 82 and 84. With such an arrangement, when the exhaust openings 94 are opened, no pressure will be exerted on the plungers 102. On the other hand, should the exhaust openings 94 be closed by the valves 96, pressure will be exerted against the plungers 102 in order to move the same to the right as viewed in Fig. 1. This action is utilized for automatically controlling the transmission mechanism in a manner to be more clearly set forth hereinafter.

In addition to the foregoing novel features, the present invention includes a novel construction whereby the torques delivered by the primary and secondary turbines 44 and 46 respectively may be made available at a common point. To this end, the outer periphery of the primary turbine 44 is suitably connected, as by means of intermeshing teeth 104, to a primary turbine driving plate 106 such plate including a sleeve 108 which is splined at 110 to a primary turbine clutch 112 having forward and rear clutch teeth 114 and 116. Since the secondary turbine 46 is formed integrally with the casing part 38, which is connected to the casing part 40, the latter forms the driving plate of the secondary turbine and is splined at 118 to a secondary turbine driving clutch 120 which is provided with a plurality of teeth 122. Due to this construction, it will be readily seen that the torques delivered by the primary and secondary turbines, compounded through the gear connections 70, 72 and 74, are made available at a common terminal point. Bearing in mind, that the primary turbine 44 rotates in a clockwise direction, the primary turbine clutch 112 is available for securing forward turbine drive. On the other hand, since the secondary turbine 46 rotates in a counterclockwise direction, the secondary turbine clutch 120 is available for securing reverse turbine drive. It will be noted that the combined torques of the primary turbine 44 and the secondary turbine 46 is delivered to both of the clutches 112 and 120.

In order to also secure a direct drive from the driving shaft 18 to the driven shaft 20, the present invention provides a direct drive clutch 124 which is splined at 126 to the inner end of the driving shaft 18 and is formed with a series of clutch teeth 128. With such a construction, a direct driving connection is readily available at a point closely adjacent the primary turbine clutch 112 and the secondary turbine clutch 120.

Means are provided for selectively connecting the primary turbine clutch 112 or the direct drive clutch 124 with the driven shaft 20 in order to establish either a forward turbine drive or a forward direct drive and such means also includes an arrangement for controlling the operation of the valves 96. As shown, such means includes a selector clutch 130 which is connected to a shiftable selector sleeve 132, the sleeve 132 being shiftable on the driven shaft 20 but drivably connected therewith through a splined connection 136. From this construction, it will be seen that movement of the clutch 130 to the left will serve to establish a direct driving connection with the direct drive clutch 124 through engagement of teeth 138 and 128. Movement of sleeve 132 to the right will bring teeth 140 of the selector clutch 130 into engagement with the teeth 114 of the turbine drive clutch 112 in order to establish the forward turbine drive. Preferably, synchronizers 142 of any suitable type may be associated with the selector clutch 130 for the purpose of synchronizing the movement of the clutches during engagement of the teeth as above set forth.

In order to coordinate the operation of the valves 96 and the movement of the selector clutch 130, a valve operating rod 144 is suitable connected at its right-hand end with a block 146 slidable in the bore 28 and has its opposite end slidably received within an opening provided in a forward pilot bearing 148. A valve operating yoke 150 is connected to the rod 144 adjacent its left end by means of a pin 152, the latter being secured to a block 154 which is confined to the rod 144 by oppositely disposed flanges 156 secured to the rod. Centering springs 158 and 160 are disposed on opposite sides of the flanges 156, it being observed that the spring 158 also abuts a shifting block 162 which in turn engages a spacing sleeve 164 which is slidably received within the direct drive clutch 124. The spring 160 functions to close the valves 96 when the selector clutch 130 is moved to the right for a forward turbine drive connection. Adjacent the right end of the rod 144 is a stationary block 166 pinned at 168 to the driven shaft 20 and a power shifting device in the form of a spring 170 is interposed between the stationary block 166 and a block 172 which is connected with the pin 134 to selector clutch member 130. It will be noted that the valve operating rod 144 will slide freely through the blocks 166, 172 and 162. With the above mentioned construction, it will be readily perceived that when direct drive is established by movement of the selector sleeve 132 to the left, such movement will also correspondingly move the block 172, sleeve 164, block 162 and spring 158 in order to move block 154 and yoke 150 to the left thereby rocking the lever 98 about its pivot 100 in order to move the valves 96 to the open position shown. Under these conditions, the impeller 42 is disconnected from the driving shaft 18 and the torque converter 10 is neutralized. Hence, when the transmission unit is established in direct drive, all circulation and agitation of fluid in the torque converter will cease and cooling of the converter may be readily effected by conducting cooling air from the front of the vehicle through cooling openings 174 around the casing 38, 40 and out through exhaust opening 176 positioned in the air stream created by the forward movement of the vehicle, at the rear and bottom of casing 14.

On the other hand, in the event that the selector sleeve 132 is moved to the right to establish forward turbine drive, through connection between the selector clutch 130 and the primary turbine clutch member 112, such movement will serve to move the block 172 to the right in order to compress the power spring 170. When this occurs, the energy stored in the valve operating spring 160 will move the block 154 and yoke 150 to the right in order to oscillate the lever 98 and effect a closing of the valves 96. As soon as this occurs, the impeller 42 will be drivably connected with the driving shaft 18 through operation of the fluid operated clutch 76 in a manner heretofore described. Rotation of the impeller 42 will re-establish the toroidal fluid circuit 69 interlinking the primary and secondary turbines 44 and 46 and thus a forward turbine drive will be established. Simultaneously with the closing of the valves 96, pressure built up in the plunger ports 92 will be exerted against the faces of the plungers 102. These plungers bear against a flange 178 which is connected to the block 162 by pin 180. Thus when the valves 96 are closed, the plungers 102 are forced outwardly and tend to move the flange 178, pin 180, block 162, sleeve 164, block 172, pin 134 and selector clutch 130 to the right in order to automatically establish turbine forward drive under certain conditions of operation which will appear more fully hereinafter. It is here desired to point out that should the forward turbine drive be automatically established by movement of the plungers 102 as just indicated, power means in the form of spring 170 will be compressed and placed in a condition to automatically shift the selector clutch 130 to establish a direct forward drive in the event that the valves 96 are moved to the position shown in Fig. 1 and pressure is relieved from the faces of the plungers 102.

For the purpose of establishing a forward or reverse turbine drive, a manually operated selector clutch 182 provided with teeth 184 and 186 is shiftable mounted through splines 188 on the sleeve 132, this construction enabling the establishment of forward turbine drive through movement of the clutch member 182 to the left or establishment of reverse turbine drive through movement of the clutch member 182 to the right. Preferably, suitable synchronizers 190 are secured to opposite sides of the clutch member 182 in order to synchronize the movements of the parts during establishment of the aforementioned driving relations. Suitable shifting yokes 192 and 194 are provided for shifting the clutch members 182 and 132 respectively.

Figure 3:
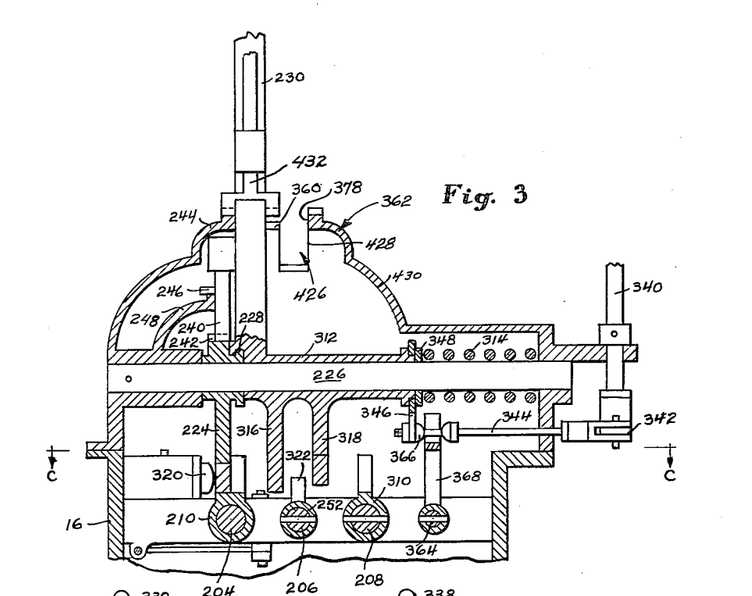
Fig. 3 is a sectional view taken along line B—B of Fig. 1.
Figure 8:
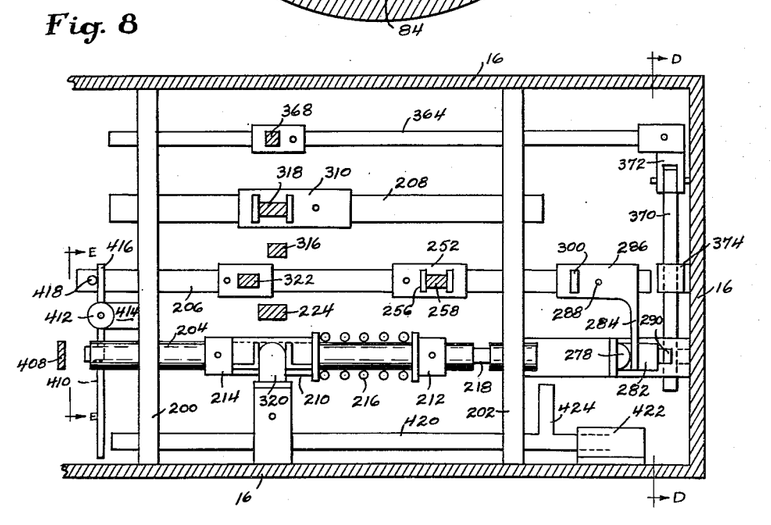
Fig. 8 is a sectional view of certain of the control mechanism taken on line C—C of Fig. 1.

Referring more particularly to Figs. 1, 3 and 8, the control mechanism 12 provides a novel arrangement for controlling the operation of the valves 96 as well as the shifting movements of the selector clutch members 130 and 182 in order to secure a highly efficient coordination between these parts. More particularly, and as shown, the casing 16 includes forward and rear cross members 200 and 202 in which a plurality of shift rails 204, 206 and 208 are shiftably supported. The rail 204 is provided with a yoke 210 loosely mounted thereon, a shifting fork 212 rigidly connected thereto, and a collar 214 fixed thereon, a spring 216 being interposed between the yoke 210 and the fork 212 in order to normally maintain the yoke in contact with the collar 214 as shown in Fig. 1. Rail 204 is also provided with a locking groove 218 adjacent its right hand end in order to receive spring urged locking plungers 220 and 222 under certain conditions of operation when the rail is moved to the right in order to establish a direct turbine drive. It is here pointed out that the rail 204 is moved to the right through operation of a cam 224 rotatably mounted on a cross shaft 226 and rotatably clutched at 228 to a control lever 230, the latter being releasably latched to the cam through a spring urged latch 240 which is normally received within a slot 242 formed in the cam. During movement of the lever 230 along segment 244, from the neutral position N to the forward turbine drive position F, a latch releasing pin 246 rides along a cam 248 in order to withdraw the latch 240 from the slot 242 for the purpose of disconnecting the lever 230 from the cam 224. During this action, movement of the yoke 210 is permitted due to the spring 216, and the releasing pin 246 is finally received in a detent 250. Thus when the parts occupy this position, the rail 204 is capable of power movement in opposite directions to establish forward direct drive or forward turbine drive, in a manner to be described hereinafter. It will be seen from the foregoing that the rail 204 controls the shifting of the mechanism into forward turbine drive and into forward direct drive, the rail 204 being hence a forward speed selecting and control member.

Rail 206 is utilized for the purpose of controlling the operation of the valves 96 which are associated with the fluid operated clutch 76. To this end, the rail 206 is provided with a shifting fork 252 secured thereto, the lower end of such fork being received within a valve shifting yoke 254 rigidly connected to the valve shifting rod 144. Rail 206 is provided with a yoke 256 for receiving a shifting cam 258, the latter being suitably supported by a cross shaft 260 and controlled in its oscillating movements through a link 262, and a bell crank 264, having arms 266 and 268. Arm 268 is secured to the link 262 as shown in Fig. 2 and the arm 266 is arranged to be moved downwardly by a plunger 270, the latter being normally spring urged in the upward direction, as shown in Fig. 2, and being positioned to be moved downwardly by an accelerator pedal 272. The accelerator pedal 272 is pivotally mounted at 274 upon any stationary part of the vehicle and is provided with a spring loaded connection 276 which is associated with the throttle valve of the vehicle engine carburetor, such connections being well known in the art. From this construction, it will be readily understood that during certain conditions of operation, as when the accelerator pedal 272 is rocked rearwardly from a closed throttle position as indicated by the dotted line C, the cam 258 will be oscillated in a clockwise direction about the cross shaft 260 in order to shift the rail 206 and shifting fork 252 to the left. This action serves to move the valve controlled rod 144 to the left and to open the valves 96 of the fluid operated clutch 76 through operation of the connections heretofore pointed out in detail. It is thus seen from Fig. 8 that movement of the rail 206 toward the left serves to open the valves 96. It is pointed out that when preferred, the position of plunger 270 may be raised so as to cause opening of the valves 96 when the throttle reaches a closed throttle position.

A further novel feature of the invention resides in the automatic control of the shifting of the valve control rail 206 to the right, as viewed in Fig. 8, for the purpose of closing the valves 96. This operation is effected through a power operated device in the form of a spring urged plunger 278, the latter being suitably mounted upon a partition wall 280 formed integrally with the casing 16, see Fig. 1. Plunger 278 is provided with a latching lip 282 and the plunger 278 and the lip 282 are normally urged to the right as by means of a spring within the casing of the plunger. During movement of the rail 206 to the left, as outlined above, the plunger 278 is moved to the retracted position shown in Figs. 1 and 8 through an arm 284 carried by a sleeve 286 which is pinned at 288 to the rail 206. When the parts occupy the position shown, they are maintained in such position through the action of a latch 290 formed integrally with rear arm 292 of a trip lever 294, such trip lever being pivotally mounted on the casing part 280 and also including a forward arm 296. The latch trip lever 294 is normally resiliently urged to the position shown in Fig. 1 by a spring 298. From this construction, it will be readily observed that during movement of the valve shifting rail 206 to the left, the spring urged plunger 278 will be moved to its retracted position by the arm 284 and latched in such position through the latch 290 of the latch trip lever 294. Hence, it is only necessary to thereafter move the latch 290 downwardly, as viewed in Fig. 1, in order to permit the spring urged plunger 278 to automatically shift the rail 206 to the right in order to automatically effect a closing of the valves 96. The mechanism for releasing the valve operating plunger 278 will be set forth hereinafter.

In addition to the foregoing functions, shifting of the valve operating rail 206 to the left also effects a release of the locking plunger 220 from the locking groove 218 of the rail 204. This action is achieved by means of an arm 300 which is secured to the sleeve 286 and is adapted to move a lower arm 302 of a bell crank 304 to the left as viewed in Fig. 1. The bell crank 304 is suitably pivotally mounted on the casing part 280 and is provided with a second arm 306 adapted to engage a head 308 formed on the plunger 220. Thus, in the event that the plunger 220 occupies the groove 218, the plunger will be withdrawn during the movement of rail 206 to the left through the cooperation between the arm 300 and the bell crank 304.

A further feature of the invention includes the provision of the control mechanism 12, of means for effecting a forward or reverse turbine drive. Such means includes the forward and reverse rail 208 which is shiftable in opposite directions as viewed in Fig. 8 and which has secured thereto a shifting fork 310 receivable within the yoke 192 for the purpose of imparting shifting movements to the clutch member 182. Thus as the forward and reverse rail 208 is shifted to the right as viewed in Fig. 8, the clutch 182 will be likewise shifted to the right in order to engage teeth 186 with teeth 122 for the purpose of establishing a reverse turbine drive. On the other hand should the rail 208 be shifted to the left as viewed in Fig. 8, the clutch member 182 will be correspondingly moved in order to connect the teeth 184 with the teeth 116 and thereby establish a forward turbine drive.

A novel arrangement is provided for selecting the rails 204 or 208 and effecting a shifting thereof through operation of the control lever 230. More particularly, and as shown in Figs. 3 and 8, the control lever 230 includes a sleeve 312 which surrounds the cross shaft 226 and is normally urged as by means of a spring 314 toward the left and to a position where the cam 224 engages the yoke 210. Sleeve 312 has a pair of lugs 316 and 318 depending therefrom, the lug 318 being adapted to engage the shifting form 310 when the sleeve 312 is shifted to the right and against the tension of spring 314. When such shift is effected, the parts will occupy the position illustrated in Fig. 8 where the lug 318 engages the yoke 310. It will be noted from Fig. 8 that as the cam 224 moves out of the yoke 210, a spring pressed plunger 320 enters the yoke. Thus, whenever the lever 230 and sleeve 312 are shifted to the right as viewed in Fig. 3, movement of the shift rail 204 is positively prevented by the spring urged plunger 320. This plunger is so constructed however as to be movable out of the yoke 210 whenever the cam 224 is returned to the position shown in Fig. 3.

Means are provided by the invention for preventing slidable movement of the sleeve 312 against the tension of spring 314 when the valve shift rail 206 occupies a position other than that illustrated in Fig. 8. Such means includes an interlock lug 322 which extends upwardly and within the path of movement of the lug 316 when the rail 206 occupies its valve closed position. However, when the valve rail 206 is moved to the left as viewed in Fig. 8, in order to effect an opening of the valves 96, the interlock lug 322 is moved out of the path of movement of the lug 316. Hence, the cross-over or movement of the sleeve 312 to the right as viewed in Fig. 3 may be effected in order to bring the lug 318 into engagement with the yoke 310.

As shown more particularly in Fig. 2, the accelerator controlled mechanism for the valve rail shifting cam 258, also includes a suplemental control which is effective when the accelerator pedal 272 is moved past its full throttle open position to position B, to also control the operation of the cam 258. It will be recalled that movement of the accelerator pedal 272 to the position C caused movement of the cam 258 in such a direction as to open the valves 96. The supplemental control just referred to is so constructed as to move the cam 258 in an opposite direction in order to effect a closing of the valves 96. Under these conditions, as will appear more fully hereinafter, movement of the accelerator pedal 272 to position B renders the torque converter 40 operative and also effects an automatic shift to turbine forward drive under certain conditions.

More particularly, and referring to Figs. 2, 4, 5 and 6, the supplemental control includes a bell crank 324 which is suitably pivotally mounted on a stationary part 326, and which includes a downwardly extending arm 328 and oppositely extending arms 330 and 332. Arm 328 is pivotally connected to the cam 258, Fig. 2, as by a link 334 which includes a spring loaded coupling 336. Normally contacting the arm 330 is a spring loaded plunger 338 which is normally projected upwardly but which is capable of moving downwardly when the accelerator pedal 272 is moved to the position B. When this occurs, the bell crank 324 will be moved in a clockwise direction about its pivotal mounting and connections 334 and 336 will move cam 258 in a counterclockwise direction about the cross shaft 260 in order to close the valves 96 through operation of the valve operating rod 144 to the right as viewed in Fig. 1.

Figures 4, 5, 6, 9, 10:
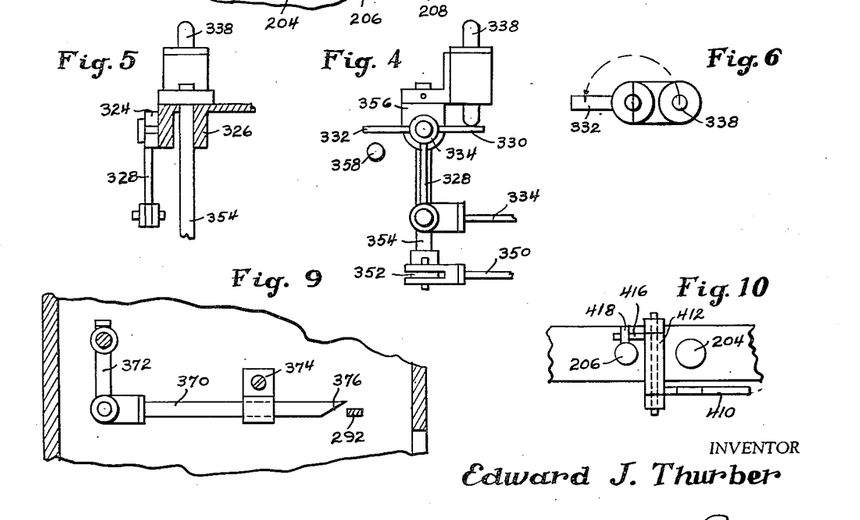
Fig. 4 is a front view of the control plunger operated by the forward portion of the accelerator pedal.
Fig. 5 is a side view of certain of the parts of Fig. 4.
Fig. 6 is a top plan view of the control plunger of Fig. 4 and illustrates the manner in which the plunger may be moved to a diametrically opposite position from that shown in Fig. 4.
Fig. 9 is a diagrammatic view, partly in section, and taken on line D—D of Fig. 8.
Fig. 10 is a side view of certain of the parts of Fig. 8 and taken substantially on line E—E of the latter.

In addition to the above, the supplemental accelerator control includes an arrangement for shifting the position of the plunger 338 from the full line position to the dotted line position illustrated in Figs. 2 and 6. This shift serves the purpose of partially opening the valves 96 when the accelerator pedal 272 is moved to the position B. The shift in the position of the plunger 338 is effected when the sleeve 312 is moved to the right during the crossover movement of the lever 230 as shown in Fig. 3. More particularly, movement of the sleeve 312 serves to rotate a rod 340 through a lever 342, a link 344 and an arm 346, the latter being resiliently held in position with respect to the sleeve 312 as by means of a washer 348 and the spring 314. Rotation of the rod 340 serves to effect, through any suitable connections, movement of a link 350 to the right, Figs. 2 and 4, which is connected through a lever 352 to a shaft 354. Shaft 354 is secured to a stationary part to which the valve operating plunger 338 is secured, so that when the link 350 is moved to the right, the plunger 338 will be shifted to a diametrically opposite position as shown in Figs. 2 and 6. A stop pin 358 is spaced below the arm 332 of the bell crank 324 in order to limit the downward movement of said arm and thereby limit the extent of the opening of the valves 96 when the accelerator pedal 272 is moved to the position B and the plunger 338 occupies the dotted line position in Fig. 2.

From the foregoing, it will be readily understood that the cross-over movement of the sleeve 312 and the lever 230 within a cross-over slot 360 of casing dome 362 serves to shift the spring urged plunger 338 to the dotted line position shown in Fig. 2 where downward movement of the accelerator pedal 272 may partially open the valve 96. In addition to such operation, such crossover movement will effect a partial rotation of rod 364, Figs. 3 and 8, which is rotatably mounted within the casing partitions 200 and 202. Such partial rotation is effected through engagement between an abutment 366 and a lug 368 secured to the rod 364. When this action occurs, the latch 290, Fig. 1, is removed from its latching position in front of lip 282 in order to permit the spring urged plunger 278 to shift the valve rail 206 to the right as viewed in Fig. 8, in order to close the control valves 96 of the fluid operated clutch 76. This release of the latch 290 is brought about by a shifting movement of a rod 370, see Figs. 8 and 9, one end of the rod being connected through an arm 372 to the rod 364 and the rod 370 being suitably guided with respect to the casing 16 as by a guide 374. The free end of the rod 370 is provided with a cam surface 376 for the purpose of contacting the arm 292 of the trip lever 294 in order to move the latch 290 downwardly, as viewed in Fig. 1, and against the tension of the spring 298. Thus, as the cross-over movement of the control lever 230 takes place, in addition to the reversal of the plunger 338, the latch 290 will be released and the valve shifting rail 206 will shift to the right, as viewed in Fig. 8, in order to close the valves 96 and re-establish the operation of the torque converter 10. Under these conditions, oscillating movement of the sleeve 312 and corresponding movement of the control lever 230 in slot 378 of the dome 362 will serve to shift the rail 208 in order to respectively establish either a forward turbine drive or a reverse turbine drive.

The present invention also provides, in addition to the foregoing features, a speed responsive device for selectively controlling various of the driving relations. More particularly, such device includes a governor preferably of the snap-action type having a plurality of governor weights 380 which are pivotally mounted at 382 to a sleeve 384 connected to the driven shaft 20 as by means of pins 386. As the governor weights 380 move outwardly, arms 388 secured thereto serve to move a yoke 390 to the right as viewed in Fig. 1 and against the tension of a governor spring 392. Such movement of the yoke 390 also serves to move the lower arm 394 of a three-arm bell crank which includes a plunger operating arm 396 and a trip arm 398, the bell crank being suitably pivotally mounted upon an extension of the casing part 280. Also pivotally mounted on the extension of the part 280 is a tripping lever having an arm 400 engaging the arm 398 and having also an arm 402 engaging the arm 296, it being pointed out that the spring 298 serves to normally maintain the arms 402 and 296 in engagement as illustrated in Fig. 1.

In addition to the foregoing novel features, the invention also provides a neutralizing device which is effective at all times to open the valves 96 to thus neutralize the torque converter 10 and to place the selector clutch 130 in a neutral position. The construction of such device is such that it may override all of the other controls heretofore described. More particularly, such device includes a lever 404, which may be a controlling element of a motor vehicle, such element having a primary and a secondary function, Figs. 1, 8 and 10, which is pivotally mounted on a cross shaft 406 and is provided with a lower end 408 adapted to engage one arm 410 of a lever 412. Lever 412 is pivotally mounted on the casing member 200 as by a bracket 414 and is provided with an oppositely extending arm 416 for engagement with a pin 418 secured to the valve operating rail 206. The arm 410 when moved to the right as viewed in Fig. 8, is adapted to engage and shift a rod 420 against the action of a spring guide 422. During this movement, an arm 424 is adapted to engage the bell crank arm 394 which is associated with the governor yoke 390, see Fig. 1. More particularly, when the neutralizing lever 404 is moved in a counterclockwise direction about the cross shaft 406, the end 408 will engage the arm 410 and move the latter to the right as viewed in Fig. 8. This will rotate the lever 412 about its pivotal mounting in the bracket 414 and move the arm 416 to the left in order to engage the pin 418 and shift the valve operating rail 206 to the left and to a position to open the valves 96. Under these conditions, the torque converter 10 will be neutralized and all circulation and agitation of the fluid therein will be arrested. It will also be noted that during this operation, the interlock lug 322 will be moved to such a position as to be clear of the path of movement of the lug 316, thus allowing cross-over movement of the sleeve 312 and the control lever 230. Substantially simultaneously with the above operation, engagement of the arm 410 with the rod 420 will serve to move the bell crank arm 394 to the right through movement of the arm 424. This movement of the bell crank arm 394 serves to withdraw the locking plunger 220 from the locking groove 218 and allow the selector clutch 130 to be returned to neutral under the action of the spring 170. This operation may be successfully carried out by reason of the fact that the locking plunger 220 has been previously withdrawn from groove 218 through operation of the bell crank 304 when the valve shifting rail 206 was moved to the left. It is to be noted that when the selector clutch 130 was returned to neutral that it was held in such position by movement of the shift rail 204 which was stopped by coming in contact with the lower end 408 of lever 404.

It is also pointed out that, when the selector clutch 130 is shifted to the left to engage the direct drive clutch 124, the shift rail 204 will also shift to the left, and when the neutralizing lever 404 is rotated counterclockwise, the lower end 408 will contact the end of shift rail 204 and shift it and the selector clutch 130 to a neutral position. In installations where it is desired to place only the converter in a neutral position, the arm 410, the rod 420 and the arm 424 can be eliminated.

It is pointed out that the dome shaped housing 362 is provided with a modified H-slot 426 which allows movement of the lever 230 to the left along segment 244 from the neutral position N to the forward position F, or to the right from position N to the direct drive position D. The slot is also such that the lever 230 may partake of the cross-over movement and occupy a slot 428 in the segment 430, and be moved back and forth therein in order to move the shift rail 206 and establish turbine forward and reverse drive. When in the slot 428, the lever 230 may be moved from the neutral slot N to a slot, not shown, for forward turbine drive. The lever 230 may be also moved in the opposite direction to a slot, not shown, for reverse turbine drive. A suitable spring pressed plunger 432 is carried by the lever 230 for cooperation with the slots provided in the segments 244 and 430, it being understood that the plunger 432 may be withdrawn, as well understood by those skilled in the art, in order to allow oscillating movement of the control lever 230. The control mechanism 12 is diagrammatically illustrated in Fig. 1. It is to pointed out that the control lever 230 is preferably arranged on the steering column in the event the invention is used in connection with an automotive vehicle. This allows the lever 230 to be readily accessible to the operator for effecting the various novel control functions heretofore outlined.

In operation, it will be assumed that the shifting lever 230 occupies the neutral position illustrated in Fig. 1 where the plunger 432 is projected into the neutral slot N. Under these conditions, the clutch member 130 will occupy the mid position illustrated where no engagement is effected with either the direct drive clutch 124 or the forward turbine driving clutch 112. Also, valves 96 are in the open position shown and the fluid clutch 76 will hence operate to draw fluid from the working circuit 69 and return such working fluid to the circuit 69 by way of exhaust openings 94 after passage through the gear pumps constituted by the gears 78, 80, 82 and 84. Under these conditions, the impeller 42 is at rest and all circulation and agitation of the fluid by way of the fluid circuit 69 is stopped.

In order to place the torque converter 10 in operation, the accelerator pedal 272 may be moved to the position C in order to keep the clutch valves 96 fully opened. This operation of the accelerator pedal through the connecting linkage including valve operating rod 144 and block 154 will further compress valve spring 160. The lever 230 may then be moved to the slot F in the segment 244. During movement toward the slot F, the cam 224 moves the yoke 210 and shifting fork 212 to the right as viewed in Fig. 1, such movement of the shifting fork being effected through the spring 216. The selector clutch sleeve 132 will thereupon be moved to the right in order to engage the clutch 130 with the forward turbine drive clutch 112, and since the clutch 130 is splined at 136 to the driven shaft 20, it will be readily understood that a forward turbine drive will be established between the shafts 18 and 20 as soon as the torque converter 10 is placed in operation. This latter function is achieved by returning the accelerator pedal 272 towards an open throttle position and permitting the valve spring 160, which was previously compressed, to expand against the valve block 154 moving it and the valve operating yoke 150 to the right, thus, the valve operating levers 98 will pivot about their mountings 100 and serve to close the valves 96.

During the aforementioned movement of the shifting fork 212, it will be understood that the shift rail 204 is likewise moved to the right to a position where the spring urged plungers 220 and 224 drop into locking position with the groove 218. Thus, the rail 204 is locked in a forward turbine driving condition until the locking plungers 220 and 222 are released by subsequent operations. It will also be noted that as the clutch member 130 moves to the right, spring 170 is compressed between the movable block 172 and the stationary block 166. Compression of such spring renders available, a power means for subsequently shifting the clutch member 130 to establish a direct driving connection with the direct drive clutch 124 during conditions when the locking plungers 220 and 222 have been withdrawn. In addition to the foregoing operations, the locking plunger 240 carried by the lever 230 is withdrawn from the cam 224 as the pin 246 rides on the cam 248 and finally drops into the detent 250. This action is ensured by reason of the loose mounting of the yoke 210 on the rail 204, the yoke being capable of sufficient movement against the tension of spring 216, after locking of the rail 204, in order to permit movement of the lever 230 to the position F and movement of the pin 246 into the detent 250.

As soon as the valves 96 have been closed in the manner aforesaid, the exhaust openings 94 will be closed and the impeller 42 will hence be effectively locked to the driving shaft 18. Thereupon, acceleration of the vehicle engine will establish the fluid circuit 69 which interlinks the impeller 42, the primary and secondary turbines 44 and 46 respectively and the stationary fluid guide member 48. During operation of the fluid circuit, the primary impeller 44 and the clutch 112 connected thereto will be rotated in a clockwise direction as viewed from the forward position of the transmission mechanism. On the other hand, the secondary turbine 46 and its connected clutch member 120 will be rotated in a counterclockwise direction. Due to the provision of the gearing 70, 72 and 74, the torques of the two turbines will be compounded and available for transmission through their respective clutches. In addition to this desirable feature of providing turbines rotating in opposite directions for securing forward and reverse drives, the use of such turbines performs a further highly desirable function. For example, the blades 62 of the primary turbine 44 are so arranged that as the fluid flows axially past these blades, the fluid is directed in a counterclockwise direction as denoted by the arrows F—Ex. Furthermore, the blades 66 of the secondary turbine 46 receive such fluid and the flow through the blades 66 rotates the secondary turbine in a counterclockwise direction. However, the blades 66 are so curved that the fluid exhausted therefrom partakes of a clockwise flow which is the same as the direction of movement of the impeller 42. Thus during the flow of fluid through the toroidal working path 69, no abrupt changes in direction are brought about and thus an increase in efficiency is secured.

When the transmission is established in the forward turbine drive as above set forth, operation of the vehicle is readily effected in the usual manner. For example, as the accelerator pedal 272 is depressed, the vehicle will increase in speed and an effective transmission of torque will be realized from the driving shaft 18 to the driven shaft 20 through the torque converter 10.

After the establishment of a predetermined speed, the governors 380 will operate to withdraw the locking plunger 222 from the groove 218. During this operation, the yoke 390 is moved to the right against the tension of the governor spring 392 in order to correspondingly move the bell crank arm 394 counterclockwise to swing the bell crank arm 396 downwardly.

Simultaneously with this action, the arm 398 contacts the tripping arm 400 and moves on top of the latter, the spring 298 serving to move the tripping lever 400, 402 back to the position illustrated in Fig. 1. With the parts in this position, the transmission may be automatically shifted to establish a direct drive merely by moving the accelerator pedal 272 to the position C, the shift being effected by the power stored in the spring 170. More particularly, as the accelerator pedal 272 is moved to the position C, the cam 258 will be rocked in a clockwise direction about the cross shaft 260 through operation of the plunger 270 and parts 266, 268 and 262. Clockwise movement of the cam 258 will move the valve operating rail 206 to the left as viewed in Fig. 1 and will move the shifting fork 252 and the valve operating rod 144 in a corresponding direction. Movement of the rod 144 will, through the parts 156, 154, 150, 152 and 98, move the valves 96 to their full open position in order to neutralize the torque converter 10. As the valve shifting rail 206 is moved to the left, see Figs. 1 and 8, the arm 300 carried by the sleeve 286 will rock the bell crank 304 in a clockwise direction about its pivotal mounting in order to release the locking plunger 220. Since the locking plunger 222 was previously released through operation of the governor 380, the shift rail 204 and parts connected thereto are shifted to the left as viewed in Fig. 1, through the energy stored in the spring 170. This action serves to disestablish the forward turbine drive and to establish the forward direct drive by bringing the clutch member 130 into engagement with the clutch member 124. Simultaneously with the movement of the valve shifting rod 206 to the left, as stated above, it will be observed that the valve operating plunger 278 is moved to its retracted position and latched therein through cooperation with the latch 290 and the lip 282. Thus, the valve shifting rail 206 is in a position to be shifted to a valve closing position as soon as the latch 290 is moved out of engagement with respect to the lip 282 in order to re-establish the fluid working circuits 69.

The operation above described is semi-automatic, for the shift from turbine drive to direct drive is under control of the accelerator pedal 272 operable at the will of the operator. Should it be desired to have this shift from turbine drive to direct drive automatically, then the plunger 220 can be locked out of action or eliminated. With such an arrangement, when a predetermined speed is reached, the action of the governor 380 will swing bell-crank arms 394 and 396 counterclockwise, withdrawing plunger 222 from the locking groove 218 on the shift rail 204. Shifting spring 170, which was previously compressed, will expand and shift selector clutch 130 out of engagement with the turbine driving clutch 112 and engage the direct driving clutch 124.

With the transmission established in the direct drive, it will again be understood that the torque converter 10 is in a neutral condition and that circulation and agitation of fluid therein is completely avoided. Thus, the torque converter 10 may be readily cooled by passage of air through the intakes 174 where such air flows around the unit and is exhausted in the air stream flowing past the exhaust opening 176. Normal operation of the vehicle in direct drive may be accomplished by merely controlling the vehicle engine through manipulation of the accelerator pedal 272 in the usual manner, it being pointed out that the energy stored in the spring 170 serves to maintain the direct drive engagement and also serves to maintain the valve shifting rod 144 and parts associated therewith in a valve opened condition.

In the event that the speed of the vehicle drops to a predetermined value, the construction is such that the transmission automatically shifts from the direct forward drive to the forward turbine drive. This action is effected by withdrawing the latch 290 from the lip 282 of the spring urged plunger 278. More particularly and bearing in mind that the arm 398 of the governor operated bell crank was positioned on top of the trip arm 400 by the preceding operation, as the speed of the driven shaft decreases, the governor spring 392 will move the yoke 390 to the left, as viewed in Fig. 1. This action will, through engagement between the arm 398 and the trip arm 400, move the latter arm downwardly in order to rock the trip member 294 in a clockwise direction. Such movement serves to move the latch 290 carried by the arm 292 downwardly, thus freeing the plunger 278 so that the latter is capable of shifting the valve operating rail 206 to the right through the arm 284 and the sleeve 286. This operation moves the shifting fork 252 to the right to effect a closing of the valves 96 through the connections heretofore described in detail. As soon as the valves 96 are closed, the impeller 42 will be connected to the driving shaft 18 and the fluid circuit 69 will be re-established. Also, the high pressure existing at the plunger ports 92, see Fig. 7, of the fluid clutch 76 will move the plungers 102 to the right as viewed in Fig. 1. This action promptly shifts the clutch member 130 out of engagement with respect to the direct drive clutch 124 and into engagement with the teeth 114 of the turbine drive clutch 112. This shift is brought about through the cooperation between the plungers 102, the shifting flange 178, the pin 180, shifting block 162, spacing sleeve 164, shifting block 172 and the pin 134 connecting the latter block with the clutch member 130. Thus, an automatic shift to forward turbine drive and re-establishment of the fluid working circuit 69 is achieved by a drop in speed of the driven shaft 20. Simultaneously with this action, the spring 170 is compressed and is in condition to autimatically re-establish a direct drive and neutralize the torque converter 10 in the event the speed of the vehicle increases to a predetermined value and the accelerator pedal 272 is moved to the position C as shown in Fig. 2. During the movement of the clutch member 130 to establish the turbine drive as previously outlined, the shift rail 204 is likewise moved to the right by the shifting fork 212. Thus, the groove 218 is moved to a position where the spring urged locking plungers 220 and 222 may enter the groove and again lock the rail 204 in position for subsequent operation as indicated.

Should the vehicle be operating in direct drive at a substantially high rate of speed, the invention provides an arrangement whereby the operator may automatically establish a forward turbine drive in order to obtain a higher degree of acceleration of the vehicle. This action is achieved by merely moving the accelerator pedal 272 past the full open throttle position and engaging and moving the spring urged plunger 338. As soon as the plunger 338 is moved, the cam 258 will be moved in a counterclockwise direction about its pivotal mounting 260 through the parts 330, 328, 334, 336 and 262, see Fig. 2. Such movement of the cam 258 will serve to move the valve operating rail 206 to the right and move the shifting fork 252 and the valve operating rod 144 in a corresponding direction. Through connections heretofore specifically set forth, the valves 96 will be closed in order to operate the fluid operated clutch 76 to connect the impeller 42 to the driving shaft 18 and thus re-establish the fluid circuit 69. As soon as this occurs, pressure will be built up against the faces of the plungers 102 and the latter will move to the right as viewed in Fig. 1 in order to shift the parts 178, 180, 162, 164, 172 and 134 selector clutch 130 to the right. This results in disconnecting the selector clutch member 130 from the direct drive clutch member 124 and connecting the former with the forward turbine drive clutch member 112. During movement of the clutch member 130, the shift rail 204 is moved to the right and again locked by the locking plunger 220. In order to shift from the turbine drive back to direct drive at high speeds, it is only necessary for the operator to shift the accelerator pedal 272 to the position C as heretofore described.

In connection with the foregoing operation, it is desired to point out and emphasive that the various relations are established by the utilization of power. For example, use is made of the compression of spring 170 for automatically establishing a direct drive. It is also observed that fluid pressure generated in fluid clutch 76 is utilized to automatically establish a forward turbine drive and to also compress the spring 170 to automatically establish a direct drive.

It will be understood that movement of the lever 230 to the slot D will serve to establish a direct drive by engaging the clutch teeth 138 and 128. This action is effected by movement of the rail 204 to the left, and operation of the fork 212 and the sleeve 132. With a direct drive established, the automobile engine can be readily started by pushing the vehicle when such procedure is required.

Should it be desired to establish the control unit 12 in a position to effect a forward or reverse turbine drive, it is first necessary to operate the neutralizing lever 404 in order to effect a neutralizing of the torque converter 10. This is brought about by moving the lever 404 in a counterclockwise direction about the cross shaft 406 to bring the lower end 408 into engagement with the arm 410 of the lever 412. Rocking of the lever 412 will, through engagement of the arm 416 with the pin 418, move the shift rail 206 to the left to the position shown in Fig. 8, in order to open the valves 96 through connections heretofore described in detail. This action moves the interlock lug 322 to a position where the cross-over movement of lever 230 may be effected. Such movement of the rail 206 also retracts the plunger 278 whereupon the lip 282 thereof is latched by the latch 290. At the same time, the rod 420 will be moved to a position such that the arm 424 connected thereto will swing the governor operated three-arm bell crank including arms 394 and 396 to withdraw the locking plunger 222 from the groove 218. Since the locking plunger 220 had previously been withdrawn from groove 218 by movement of the rail 206 and operation of the bell crank 304, it will be readily understood that the rail 204 and parts connected thereto will be returned to the neutral position illustrated through the energy stored in the spring 170. Further movement of the rail 204 and the clutch 130 connected thereto, to the left, as viewed in Fig. 1, is prevented by contact with the arm 408 of the neutralizing lever 404.

It is desired to point out here that as the lever 404 is moved to its neutralizing position, a lug 405 attached thereto engages a stop lug 407 secured to the casing 14. In this manner, the neutralizing movement of the lever 404 is limited.

When the parts reach the positions above outlined, the lever 230 and the sleeve 312 may be moved to the slot 428. As soon as this movement is effected, the lug 318 is engaged with the yoke 310 of the forward and reverse shaft rail 208, and the cam 224 is moved out of engagement with respect to the yoke 210 on rail 204. However, the spring urged plunger 320 immediately is projected into locking engagement with the yoke 210 in order to positively prevent any shifting movement of the rail 204 while the shifting lever 230 occupies the forward and reverse shifting slot 428. The neutralizing lever 404 may then be returned to its former inoperative position as illustrated in Fig. 1.

As heretofore outlined in detail, the cross-over movement of the sleeve 312 effects a reversal of the position of the plunger 338 as shown in dotted lines in Fig. 2. This reversal is effected by the parts 346, 366, 344, lever 342, rod 340, arm 350, lever 352 and rod 354. As soon as the reversal of the position of plunger 338 is effected, such plunger is in a position to achieve a novel function which will appear more fully hereinafter.

It will also be noted that when the cross-over was effected, the rod 364 was partially rotated in order to advance the part 370 and release the latch 290 from the engagement with the lip 282. This action allows the spring urged plunger 278 to shift the valve controlling rail 206 to the right as shown in Fig. 8 in order to close the valves 96 through fork 252 and other connections previously related, and thus re-establish the fluid working circuit 69.

With the parts in the positions recited above, forward turbine drive may be established by moving the lever 230 in the slot 428 to a position to shift the rail 208 to the left as viewed in Fig. 8, and shift the fork 310 and clutch 182 likewise to the left. Thus, teeth 184 are engaged with teeth 116 and the forward turbine drive is established.

On the other hand, should it be desired to shift the clutch member 182 into engagement with the turbine reverse clutch member 120, to establish a reverse turbine drive, it is only necessary to move the lever 230 in a counterclockwise direction about its cross shaft 226 as viewed in Fig. 1. When this occurs, the shift rail 208 and shifting fork 310 may be moved to the right in order to establish the reverse drive with the teeth 186 engaged with the teeth 122.

A further novel control feature resides in obtaining additional acceleration of the vehicle in the event that the clutch member 182 is engaged with the clutch member 112 for the purpose of establishing the forward turbine drive. For example, assuming that the vehicle and the engine speed have been reduced by an overload condition. Assume further that the engine delivers its peak torque output of about 1800 R. P. M. and that the overload condition has reduced the engine speed to 1000 R. P. M., for example. Under these conditions, the fluid pressure in the fluid clutch 76 is in the neighborhood of 300 pounds per square inch. Under such overload conditions, additional acceleration is secured in the following manner. The operator depresses the accelerator pedal 272 beyond its full throttle position and engages and moves the plunger 338 until the lever arm 332 engages the stop 358, see Figs. 2 and 4. Under these conditions, the cam 258 will be moved a limited distance in a clockwise direction about its pivotal mounting 260 through the parts 328, 334, 336 and 262. Such clockwise movement of the cam 258 will serve to partially open the valves 96 through the fork 252 and valve operating rod 144 and the parts associated therewith. Under conditions of partial opening of the valves 96, some of the fluid locked within the fluid clutch 76 will be permitted to escape through the exhaust openings 94 allowing the fluid clutch 76 and the impeller 42 attached thereto to slip or lag behind the driving shaft speed. Thus, the vehicle engine will be partially unloaded so that its speed may increase and again reach a speed where it may deliver its peak torque. It will be noted that when the engine speeds up, the pump gears of the fluid clutch 76 also increase their speed and the pump capacity is thereby increased. Hence, the fluid pressure in the fluid clutch may again be brought up to full capacity. Under these conditions, the engine speed has been enabled to be increased to 1800 R. P. M., for example, and can accelerate the load which it could not accommodate when the engine speed was forced down to 1000 R. P. M. As soon as the need for vehicle acceleration is passed, the operator may return the accelerator pedal 272 to its open throttle position. As soon as this is effected, the control valves 96 will again be closed and the normal forward turbine drive will be re-established.

It is pointed out that the novel controls in the unit 12 provide many advantageous features. For example, the control lever 230, which may be located on the steering column of an automobile, may be operated manually to directly effect a forward turbine drive, a reverse turbine drive or a direct drive, or to place the selector clutches in a neutral position and simultaneously operate the valves 96 that operate to connect and disconnect the impeller 42 from the driving shaft 18 and coincidentally stop the circulation and agitation of the fluid in the converter. Thus, both the converter 10 and the selector clutch 130 are placed in a neutral condition. Control lever 230 may also directly connect the driving shaft 18 to the driven shaft 20 which affords many advantages including means for starting the engine by pushing the automobile and also provides means for using the engine to brake the movement of the automobile when the throttle is closed or ineffective. When the control lever 230 is operating in rail 208 which provides a turbine forward and reverse drive, the operator can conveniently rock the automobile back and forth when stuck in sand, snow, and such. It is also to be noted that the control lever 230 imparts two different operating characteristics to the device. For instance, when operating through rail 204 the operator has the choice of making the selections manually, automatically or semi-automatically. On the other hand when operating through rail 208, the operator may make all selections manually. Another advantageous feature is in providing means for automatically disconnecting the converter and stopping the fluid circulation and agitation when the selector clutch 130 is directly connected to the driven shaft or when the selector clutch 130 is placed in a neutral position.

While the invention has been shown and described herein with considerable particularity, it will be readily understood by those skilled in the art that various modifications may be resorted to without departing from the spirit of the invention. Reference will therefore be had to the appended claims for a definition of the limits of the invention.

What is claimed is:

1. A hydraulic transmission mechanism comprising a rotatable driving shaft and a rotatable driven shaft, a casing containing a working fluid and also having a rotatable impeller therein connectible with said driving shaft for establishing a circulation of the working fluid in a closed path, means for connecting and disconnecting the impeller to and from the driving shaft, a pair of turbine members arranged to rotate in opposite directions, one of said turbine members being provided with a plurality of blades arranged axially thereof for receiving the fluid from the impeller and for directing said fluid axially therethrough and to the other turbine, the latter turbine being bladed to direct the fluid radially inwardly and to return the fluid to the impeller, a pair of driven clutch members arranged adjacent each other and respectively connected with the turbine members for opposite rotation thereby, means interconnecting the turbine members to compound the torques delivered thereby and to deliver such compounded torques to both of said driven clutch members, and means for selectively connecting said clutch members to said driven shaft to establish a forward or reverse turbine drive.

2. A hydraulic transmission mechanism comprising a rotatable driving shaft, a driven shaft, a casing containing a working fluid and also having a rotatable impeller therein for establishing a circulation of the working fluid in a closed path, means connecting the impeller with the driving shaft, a pair of turbine members arranged to rotate in opposite directions, one of said turbine members being provided with a plurality of blades arranged axially thereof for receiving the fluid from the impeller and for directing said fluid axially and to the other turbine member, the latter turbine member being bladed to direct the fluid radially inwardly and to return the fluid to the impeller, means connecting one of said turbine members with said casing, a driven member connected with said casing, a second driven member positioned adjacent the first named driven member and connected with the other turbine member, means interconnecting the turbine members to compound the torques delivered thereby and to deliver such compounded torques to both of said driven members, means for directly connecting said driving and driven shafts to establish a direct drive, and controlling means operable to disconnect the impeller from the driving shaft when the driving and driven shafts are connected to thereby prevent rotation of the impeller.

3. A hydraulic transmission mechanism comprising a rotatable driving shaft, a casing containing a working fluid and also having a rotatable impeller therein for establishing a circulation of the working fluid in a closed path, means including a fluid pressure operated clutch for connecting the impeller with the driving shaft, a pair of turbine members arranged to rotate in opposite directions, one of said turbine members being provided with a plurality of blades arranged axially thereof for receiving the fluid from the impeller and for directing said fluid axially and to the other turbine member, the latter turbine member being bladed to direct the fluid radially inwardly and to return the fluid to the impeller, means connecting one of said turbine members with said casing, a driven member connected with said casing, a second driven member positioned adjacent the first named driven member and connected with the other turbine member, an output member movable into engagement with at least one of said driven members, and means for at will controlling the operation of said clutch and the movement of said output member.

4. A hydraulic transmission mechanism comprising a rotatable driving shaft, a casing containing a working fluid and also having a rotatable impeller therein for establishing a circulation of the working fluid in a closed path, means connecting the impeller with the driving shaft, a pair of turbine members arranged to rotate in opposite directions, one of said turbine members being provided with a plurality of blades arranged axially thereof for receiving the fluid from the impeller and for directing said fluid axially and to the other turbine member, the latter turbine member being bladed to direct the fluid radially inwardly and to return the fluid to the impeller, means connecting one of said turbine members with said casing, a driven member connected with said casing, a second driven member positioned adjacent the first named driven member and connected with the other turbine member, means interconnecting the turbine members to compound the torques delivered thereby and to deliver such compounded torques to both of said driven members, and a manually operable controlling member movable at will to place the transmission mechanism in a neutral condition.

5. A hydraulic transmission mechanism comprising a rotatable driving shaft, a casing containing a working fluid and also having a rotatable impeller therein for establishing a circulation of the working fluid in a closed path, means connecting the impeller with the driving shaft, a pair of turbine members arranged to rotate in opposite directions, one of said turbine members being provided with a plurality of blades arranged axially thereof and mounted on the outer periphery of a sealed drum to exclude the accumulation of surplus fluid within said closed path, said axially arranged blades receiving the fluid from the impeller and directing said fluid axially and to the other turbine member, the latter turbine member being bladed to direct the fluid radially inwardly and to return the fluid to the impeller, a pair of driven members arranged adjacent each other exteriorly of the casing and respectively connected with the turbine members, means interconnecting the turbine members to compound the torques delivered thereby and to deliver such compounded torques to both of said driven members, and a manually operable controlling member movable at will to place the transmission mechanism in a neutral condition.

6. A hydraulic transmission mechanism comprising a rotatable driving shaft, a driven shaft having a shiftable clutch element connected therewith, a casing containing a working fluid arranged coaxially of said driving shaft, an impeller within the casing, means for rotatably mounting the impeller on the shaft, turbine and reaction members within the casing and cooperating with the working fluid when the impeller is rotated for the conversion of torque, means for connecting the impeller with the driving shaft to establish a fluid working circuit interlinking the impeller, turbine and reaction members, said driving shaft extending through said casing, turbine, reaction member and impeller and having a driving member secured thereto, means for operating said clutch element to connect said driving and driven shafts, means for disconnecting the impeller from the driving shaft to arrest the circulation and agitation of the working fluid while the driving shaft is rotating, valve means movable to place the transmission mechanism in a neutral condition and a manually controllable element operable at will for moving said valve means.

7. A hydraulic transmission mechanism comprising a rotatable driving shaft, a driven shaft, a casing containing a working fluid arranged coaxially of said driving shaft, an impeller within the casing, means for rotatably mounting the impeller on the driving shaft, turbine and reaction members within the casing and cooperating with the working fluid when the impeller is rotated for the conversion of torque, an output member movable for connection with said turbine member, hydraulic means for either connecting the impeller with the driving shaft to establish a fluid working circuit interlinking the impeller, turbine and reaction members or for disconnecting the impeller from the driving shaft, means for connecting said driving and driven shafts, valve means for controlling said hydraulic means, and means for moving said output member and operating said valve means.

8. A hydraulic transmission mechanism comprising a rotatable driving shaft, a driven shaft, a casing containing a working fluid arranged coaxially of said driving shaft, an impeller within the casing, means for rotatably mounting the impeller on the shaft, turbine and reaction members within the casing and cooperating with the working fluid when the impeller is rotated for the conversion of torque, an output member movable for connection with said turbine member, a fluid operated clutch for either connecting the impeller with the driving shaft to establish a fluid working circuit interlinking the impeller, turbine and reaction members, or for disconnecting the impeller from the driving shaft, means for connecting said driving and driven shafts, valve means for controlling said fluid operated clutch, and means for moving said output member and operating said valve means.

9. A hydraulic transmission mechanism as set forth in claim 8 wherein said clutch includes a part drivably connected at all times with the driving shaft.

10. A hydraulic transmission mechanism as set forth in claim 8 wherein said clutch includes a gear pump having a gear connected with the driving shaft and a gear carried by the impeller.

11. A hydraulic transmission mechanism as set forth in claim 10 which includes in addition, means to establish a flow of the working fluid through the gear pump.

12. A hydraulic transmission mechanism comprising a rotatable driving shaft, a casing containing a working fluid arranged coaxially of said shaft, an impeller within the casing, means for rotatably mounting the impeller on the shaft, turbine and reaction members within the casing and cooperating with the working fluid when the impeller is rotated for the conversion of torque, an output member movable for connection said turbine member, means for connecting and disconnecting the impeller to and from the driving shaft to respectively establish and disestablish a fluid working circuit interlinking the impeller, turbine and reaction members, comprising a gear pump clutch having a part connected with the driving shaft and a part carried by the impeller, passage means for conducting fluid from the working circuit through the clutch and back to the working circuit, a valve in said passage means to control the passage of fluid therethrough, and means for controlling the operation of said valve and for moving said output member.

13. A hydraulic transmission mechanism comprising a driving shaft and a driven shaft, a casing containing a working fluid and also having a rotatable impeller therein for establishing a circulation of the working fluid in a closed path, a pair of turbine members arranged to rotate in opposite directions when the working fluid is circulated, a pair of driven members arranged adjacent each other exteriorly of the casing and respectively connected with the turbine members, hydraulic means operable to connect and disconnect the impeller to and from the driving shaft to control the circulation of the working fluid, a shiftable driven member drivably connected with the driven shaft and movable into and out of engagement with respect to at least one of said pair of driven members, means for controlling the operation of said hydraulic means, and means interconnecting the controlling means and the shiftable driven member.

14. A hydraulic transmission mechanism comprising a driving shaft and a driven shaft, a casing containing a working fluid and also having a rotatable impeller therein for establishing a circulation of the working fluid in a closed path, a pair of turbine members arranged to rotate in opposite directions when the working fluid is circulated, a pair of driven members arranged adjacent each other exteriorly of the casing and respectively connected with the turbine members, hydraulic means operable to connect and disconnect the impeller to and from the driving shaft to control the circulation of the working fluid, a shiftable driven member drivably connected with the driven shaft, means for controlling the operation of the hydraulic means, and means responsive to fluid pressure developed by said hydraulic means when the latter operates to connect the impeller with the driving shaft to move said shiftable member into driving engagement with one of said driven members.

15. A hydraulic transmission mechanism comprising a driving shaft and a driven shaft, a casing containing a working fluid and also having a rotatable impeller therein for establishing a circulation of the working fluid in a closed path, a pair of turbine members arranged to rotate in opposite directions when the working fluid is circulated, a pair of driven members arranged adjacent each other exteriorly of the casing and respectively connected with the turbine members, hydraulic means operable to connect and disconnect the impeller to and from the driving shaft to control the circulation of the working fluid, means to selectively drivably connect one or the other of the driven members with the driven shaft to rotate the latter in a forward or reverse direction, means for controlling the operation of the hydraulic means, a shiftable clutch member drivably connected with the driven shaft, and means responsive to fluid pressure developed by said hydraulic means when the latter operates to connect the impeller with the driving shaft to move the shiftable member into driving engagement with one of said driven members.

16. A hydraulic transmission mechanism comprising a driving shaft and a driven shaft, a fluid torque converter arranged coaxially of the driving shaft and including an impeller, a casing containing a working fluid, a turbine and a reaction member, said impeller being rotatably supported with respect to the driving shaft, a hydraulically operated gear clutch associated with the impeller for connecting the impeller to and for disconnecting it from the driving shaft, passage means for conducting fluid from said casing through the clutch and for returning such fluid to the casing, valve means for controlling said passage means to thereby control the clutch, and means operable by fluid pressure developed in said passage means when the latter is closed by said valve means for connecting said turbine member and driven shaft.

17. A hydraulic transmission mechanism comprising a driving shaft and a driven shaft, a fluid torque converter arranged coaxially of the driving shaft and including an impeller, a casing containing a working fluid, a turbine and a reaction member, said impeller being rotatably supported with respect to the driving shaft, a hydraulically operated gear clutch associated with the impeller for connecting the impeller to and for disconnecting it from the driving shaft, said clutch including a gear carried by the driving shaft and cooperating gears carried by said impeller, all of said gears constituting a plurality of gear pumps, passage means for conducting fluid from said casing through the gear pumps and for returning such fluid to the casing, valve means for controlling said passage means to thereby control the clutch, and means operable by fluid pressure developed in said passage means when the latter are closed by said valve means for connecting said turbine member and driven shaft.

18. A hydraulic transmission mechanism comprising a driving shaft and a driven shaft, a casing containing a working fluid and also having a rotatable impeller therein for establishing a circulation of the working fluid in a closed path, a pair of turbine members within the casing and arranged to rotate in opposite directions when the working fluid is circulated, a pair of driven members arranged adjacent each other exteriorly of the casing and respectively connected with the turbine members, hydraulic means operable to connect and disconnect the impeller to and from the driving shaft to control the circulation of the working fluid, a shiftable driven member drivably connected with the driven shaft and movable into and out of engagement with respect to either of said driven members to establish a forward turbine drive or a reverse turbine drive, a driving member directly connected with the driving shaft and arranged adjacent one of said driven members, a shiftable driven element drivably connected with the driven shaft and movable into engagement with said one driven member or said driving member to establish forward turbine drive or forward direct drive, means for controlling the operation of said hydraulic means, and means responsive to operation of said hydraulic means to move said shiftable driven element into engagement with said one driven member.

19. A hydraulic transmission mechanism comprising a driving shaft and a driven shaft, a fluid torque converter arranged coaxially of the driving shaft and including an impeller, a casing containing a working fluid, a turbine and a reaction member, said impeller being rotatably supported with respect to the driving shaft, means for connecting said impeller to the driving shaft for establishing a fluid working circuit and for disconnecting the impeller from the driving shaft to arrest circulation and agitation of the fluid, a turbine clutch member connected with the turbine, a direct drive clutch member connected with the driving shaft, a driven clutch element connected with the driven shaft and mounted for movement into selective engagement with the turbine clutch member or the direct drive clutch member, power means operable when the impeller is connected with the driving shaft for shifting the driven clutch element into engagement with one of said clutch members, and separate power means automatically operable to shift the driven clutch element into engagement with the other clutch member.

20. A hydraulic transmission mechanism comprising a driving shaft and a driven shaft, a fluid torque converter arranged coaxially of the driving shaft and including an impeller, a casing containing a working fluid, a turbine and a reaction member, said impeller being rotatably supported with respect to the driving shaft, a hydraulically operated gear clutch associated with the impeller for connecting the impeller to and for disconnecting it from the driving shaft, a turbine clutch member connected with the turbine, a direct drive clutch member connected with the driving shaft, a driven clutch element connected with the driven shaft and mounted for movement into selective engagement with the turbine clutch member or the direct drive clutch member, fluid operated means responsive to operation of said gear clutch when the impeller is connected with the driving shaft for shifting the driven clutch element into engagement with the turbine clutch member, and power means automatically operable to shift the driven clutch element into engagement with the direct drive clutch member.

21. A hydraulic transmission mechanism comprising a driving shaft and a driven shaft, a fluid torque converter arranged coaxially of the driving shaft and including an impeller, a casing containing a working fluid, a turbine and a reaction member, said impeller being rotatably supported with respect to the driving shaft, a hydraulically operated gear clutch associated with the impeller for connecting the impeller to and for disconnecting it from the driving shaft, a turbine clutch member connected with the turbine, a direct drive clutch member connected with the driving shaft, a driven clutch element connected with the driven shaft and mounted for movement into selective engagement with the turbine clutch member or the direct drive clutch member, fluid operated means responsive to operation of said gear clutch when the impeller is connected with the driving shaft for shifting the driven clutch element into engagement with the turbine clutch member, and manually controlled power means for shifting the driven clutch element into engagement with the direct drive clutch member.

22. A hydraulic transmission mechanism as set forth in claim 21 wherein the manually controlled power means includes a spring which is compressed when the driven clutch element is moved into engagement with the turbine clutch member.

23. A hydraulic transmission mechanism comprising a driving shaft and a driven shaft, a fluid torque converter arranged coaxially of the driving shaft and including an impeller, a casing containing a working fluid, a turbine and a reaction member, said impeller being rotatably supported with respect to the driving shaft, a hydraulically operated gear clutch associated with the impeller for connecting the impeller to and for disconnecting it from the driving shaft, a turbine clutch member connected with the turbine, a direct drive clutch member connected with the driving shaft, a driven clutch element connected with the driven shaft and mounted for movement into selective engagement with the turbine clutch member or the direct drive clutch member, fluid operated means responsive to operation of said gear clutch when the impeller is connected with the driving shaft for shifting the driven clutch element into engagement with the turbine clutch member, a spring arranged coaxially of the driven shaft and operatively connected with the driven clutch element, means to compress said spring when the driven clutch element is moved into engagement with the turbine clutch member, and means including a manually operable element for releasing said compressed spring to shift the driven clutch element into engagement with the direct drive clutch member.

24. A hydraulic transmission mechanism comprising a driving shaft and a driven shaft, a casing containing a working fluid and also having a rotatable impeller therein for establishing a circulation of the working fluid in a closed path, a pair of turbine members within the casing and arranged to rotate in opposite directions when the working fluid is circulated, a pair of driven members arranged adjacent each other exteriorly of the casing and respectively connected with the turbine members, a driving clutch element connected with the driving shaft, a first clutch member connected with the driven shaft and arranged to be moved in opposite directions to selectively engage one of said driven members or the driving clutch element, a second clutch member connected with the driven shaft and movable in opposite directions to selectively engage either of said driven members, a pair of shiftable rails respectively connected with said first and second clutch members, a selector lever mounted for selective engagement with either of said rails to shift the latter, and means for moving said first and second clutch members to a neutral position.

25. A hydraulic transmission mechanism according to claim 1, which comprises in addition, a clutch element connected with said driving shaft and positioned adjacent one of said driven clutch members, and means for selectively connecting said driven shaft with said clutch element or with said one driven clutch member.

References Cited in the file of this patent

UNITED STATES PATENTS

| | | |
|---|---|---|
| 1,855,967 | Jandasek | Apr. 26, 1932 |
| 1,900,119 | Lysholm et al. | Mar. 7, 1933 |
| 2,042,189 | Rabe | May 26, 1936 |
| 2,145,005 | Fichtner | Jan. 24, 1939 |
| 2,152,113 | Van Lammeren | Mar. 28, 1939 |
| 2,162,803 | England | June 20, 1939 |
| 2,226,801 | Black | Dec. 31, 1940 |
| 2,258,684 | Lysholm et al. | Oct. 14, 1941 |
| 2,260,015 | Fichtner | Oct. 21, 1941 |
| 2,271,919 | Jandasek | Feb. 31, 1942 |
| 2,297,259 | Speiser | Sept. 29, 1942 |
| 2,304,721 | Werther | Dec. 8, 1942 |
| 2,313,645 | Jandasek | Mar. 9, 1943 |
| 2,324,693 | Griswold et al. | July 20, 1943 |
| 2,327,647 | Jandasek | Aug. 24, 1943 |
| 2,359,423 | Johnson | Oct. 3, 1944 |
| 2,397,634 | Voytech | Apr. 2, 1946 |
| 2,411,463 | Pozgay | Nov. 19, 1946 |
| 2,432,115 | Mayner | Dec. 9, 1947 |
| 2,493,592 | Peabody | Jan. 3, 1950 |
| 2,495,515 | Foley | Jan. 24, 1950 |
| 2,530,205 | Morse | Nov. 14, 1950 |
| 2,585,149 | McGill | Feb. 12, 1952 |
| 2,632,539 | Black | Mar. 24, 1953 |